United States
O'Connor

[11] 3,711,186
[45] Jan. 16, 1973

[54] MICROSCOPE OBJECTIVES
[75] Inventor: Anthony O'Connor, Yorkshire, England
[73] Assignee: Vickers Limited, London, England
[22] Filed: Feb. 2, 1971
[21] Appl. No.: 111,866

[30] Foreign Application Priority Data

Feb. 10, 1970 Great Britain..................6,385/70

[52] U.S. Cl.............350/214, 350/175 ML, 350/177
[51] Int. Cl.................................................G02b 21/02
[58] Field of Search........350/175 ML, 177, 214, 215

[56] References Cited
UNITED STATES PATENTS

| | | | |
|---|---|---|---|
| 3,380,793 | 4/1968 | Klein | 350/214 X |
| 3,405,993 | 10/1968 | Aklin et al. | 350/177 |
| 2,644,943 | 7/1953 | Klein | 350/215 X |
| 3,572,902 | 3/1971 | Uetake | 350/177 |

*Primary Examiner*—John K. Corbin
*Attorney*—Pennie, Edmonds, Morton, Taylor & Adams

[57] ABSTRACT

An apochromatic microscope objective comprises a first lens assembly of converging lens elements, a second lens assembly of correcting lens elements for reducing aberrations present in the beam as a result of passage through the first lens assembly, an a field-flattening lens assembly which includes first and second positive-power lens elements made of glass that is anomalous in the same sense as fluorite, and first and second negative-power lens elements. The first negative-power lens element is made of glass that is anomalous in the opposite sense to fluorite and is one component of a positive-power compound lens of which the first positive-power lens element is another component. The second negative-power lens element is spaced from the compound lens to impose negative field curvature on the light beam and is one component of a compound lens of high negative power a further component of which is the second positive-power lens element.

1 Claim, 3 Drawing Figures

PATENTED JAN 16 1973

Inventor
Anthony O'Connor
By
Pennie, Edmonds, Morton, Taylor & Adams
Attorneys

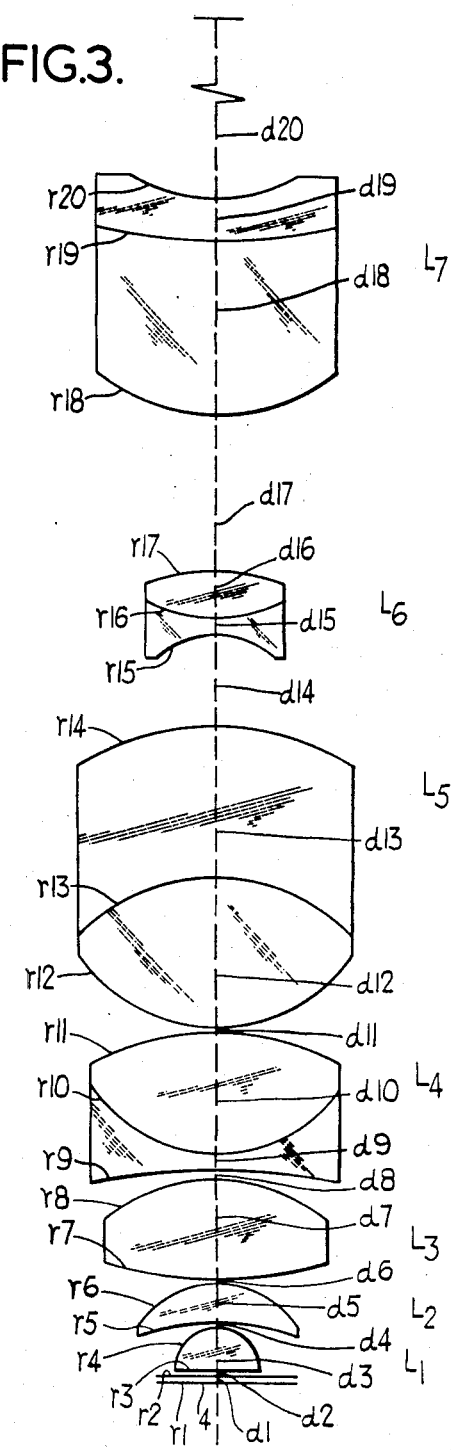

MICROSCOPE OBJECTIVES

This invention relates to apochromatic microscope objectives.

A microscope objective is apochromatic if the image distance for a given object is the same for three wavelengths of light.

In the design of microscope objectives, it is well known to those acquainted with the art that the achieving of an apochromatic correction and the flattening of the image field become increasingly difficult with increasing numerical aperture. Apochromatic correction is achieved mainly by making extensive use of anomalous glasses, for example fluorite, but also by maximizing the contribution of negative power components of the objectives by maintaining large apertures at these components (i.e. by the use of triplets and/or closely spaced doublets). Field flattening is achieved by maximizing the contributions of negative power components of the objectives to the respective Petzval sums of the objectives, but in order to preserve positive total power small apertures are maintained at these negative power components (i.e. thick negative meniscus lenses and/or separated positive and negative lenses are used).

Thus it can be seen that field flattening and the achievement of an apochromatic correction are to some extent mutually conflicting desiderata.

There are two kinds of anomalous glass and their different properties may be illustrated by considering a conventional achromatic doublet comprising a positive power component and a negative power component, both of non-anomalous glass, for example crown or flint. If the positive power component of the doublet is replaced by a lens element which is made glass that is anomalous in the same sense as fluorite, but which is otherwise the same as the component which it replaced, the secondary spectrum of the doublet will be reduced, but if it is replaced by a lens element which is made of glass that is anomalous in the opposite sense to fluorite, for example borate flint, but which is otherwise the same as the component which it replaced, the secondary spectrum of the doublet will be increased. As a corollary, if the negative power component of the doublet is replaced by a lens element which is made of fluorite, but which is otherwise the same as the component which it replaced, the secondary spectrum of the doublet will be increased, but if it is replaced by a lens element which is made of borate flint, but which is otherwise the same as the component which it replaced, the secondary spectrum of the doublet will be reduced.

It is known to use cemented triplet lenses of anomalous glass to achieve apochromatic correction, but there are difficulties associated with the manufacture of such lenses. It is also known (see British Patent specification No. 1,140,991) to use doublet hemispherical front lenses to achieve field flattening, but again there are difficulties associated with the manufacture of such lenses. British Patent specification No. 1,140,991 describes in detail two microscope objectives, each of which employs two cemented triplets and a doublet hemispherical front lens and thereby achieves good field flattening and produces chromatic correction which improves on conventional achromatic objectives, but which is not sufficient to produce an apochromatic correction. British Patent specification No. 1,130,200 describes in detail a microscope objective which does not employ triplet lenses or a doublet hemispherical front lens and which still produces some field flattening, but the chromatic correction is no better than is achieved with conventional achromatic objectives.

According to the present invention there is provided an apochromatic microscope objective, comprising, when considered in the direction in which a light beam bearing an image of an object being viewed through a microscope employing the objective passes, a first lens assembly, of converging lens elements, a second lens assembly, of correcting lens elements, for reducing aberrations present in the beam as a result of passage through the first lens assembly, and a field-flattening lens assembly which includes a positive-power lens and a negative-power lens element which is spaced from the positive-power lens to impose negative field curvature on the light beam, the negative-power lens element being one component of a compound lens of high negative power a further component of which is a positive-power lens element made of glass that is anomalous in the same sense as fluorite.

For a better understanding of the invention, and to show how the same may be carried into effect, reference will now be made, by way of example, to the accompanying diagrammatic drawings in which like reference characters relate to like parts and in which:

FIG. 3 shows an axial sectional view on a greatly enlarged scale of a second apochromatic oil immersion microscope objective suitable for use in the microscope of FIG. 1.

Figure 2:
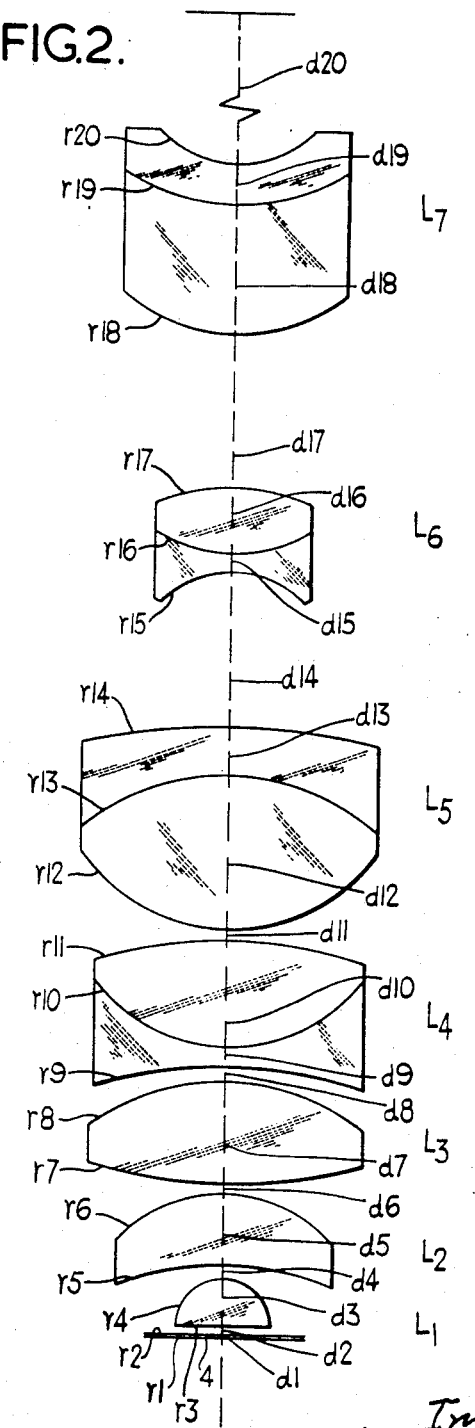
FIG. 2 is an axial sectional view on a greatly enlarged scale of an apochromatic oil immersion microscope objective suitable for use in the microscope shown in FIG. 1.

The following Tables 1 and 2 give data pertaining to the objectives shown in FIGS. 2 and 3 respectively. The tables list the radii $r$ of curvature of the various interfaces in the respective objectives, the separations $d$ of the interfaces, as measured along the respective optical axes of the objectives, the respective refractive indices of the various media between the interfaces, and the respective Abbe numbers of the media. All linear dimensions are given in millimeters.

The distances $d20$ shown in FIGS. 2 and 3 and Tables 1 and 2 are the distances from the back faces of the respective objectives to the primary images formed by the objectives of objects immediately below their respective cover glasses.

TABLE 1

| | Radius of Curvature | Thickness or Separation | Refractive index | Abbe number |
|---|---|---|---|---|
| | $r1 = \infty$ | | | |
| Cover glass | | $d1 = 0.18$ | 1.524 | 58.87 |
| | $r2 = \infty$ | | | |
| Immersion oil | | $d2 = 0.14$ | 1.52377 | 43.22 |
| $L_1$ | $r3 = \infty$ | $d3 = 2.26$ | 1.57427 | 52.02 |
| | $r4 = -1.778$ | $d4 = 0.09$ | 1.0 | |
| $L_2$ | $r5 = -15.939$ | $d5 = 3.10$ | 1.62040 | 60.29 |
| | $r6 = -5.334$ | $d6 = 0.24$ | 1.0 | |
| $L_3$ | $r7 = 21.618$ | $d7 = 4.22$ | 1.43384 | 95.56 |
| | $r8 = -8.687$ | $d8 = 0.08$ | 1.0 | |
| $L_4$ | $r9 = -24.511$ | $d9 = 0.89$ | 1.61400 | 43.89 |
| | $r10 = 6.477$ | $d10 = 4.32$ | 1.43384 | 95.56 |
| | $r11 = -13.525$ | $d11 = 0.15$ | 1.0 | |

| | | | |
|---|---|---|---|
| $L_5$ | $r12 = 0$ 6.800 | $d12 = 6.07$ 1.43384 | 95.56 |
| | $r13 = -9.294$ | $d13 = 1.68$ 1.61400 | 43.89 |
| | $r14 = -37.592$ | $d14 = 0.20$ 1.0 | |
| $L_6$ | $r15 = -3.837$ | $d15 = 0.84$ 1.61400 | 43.89 |
| | $r16 = 5.255$ | $d16 = 2.51$ 1.43384 | 95.56 |
| | $r17 = -6.752$ | $d17 = 5.97$ 1.0 | |
| $L_7$ | $r18 = 6.967$ | $d18 = 5.23$ 1.76182 | 26.72 |
| | $r19 = 9.199$ | $d19 = 1.40$ 1.53033 | 51.19 |
| | $r20 = 4.569$ | $d20 = 144.45$ 1.0 | |

TABLE 2

| | Radius of Curvature | Thickness or Separation | Refractive index | Abbe number |
|---|---|---|---|---|
| | $r1 = \infty$ | | | |
| Cover glass | | $d1 = 0.18$ | 1.524 | 58.87 |
| | $r2 = \infty$ | | | |
| Immersion oil | | $d2 = 0.14$ | 1.52377 | 43.22 |
| $L_1$ | $r3 = \infty$ | | | |
| | | $d3 = 1.59$ | 1.574727 | 52.02 |
| | $r4 = -1.56$ | $d4 = 0.04$ | 1.0 | |
| $L_2$ | $r5 = -9.84$ | $d5 = 1.73$ | 1.62040 | 60.29 |
| | $r6 = -3.62$ | $d6 = 0.15$ | | |
| $L_3$ | $r7 = 19.68$ | $d7 = 4.01$ | 1.43384 | 95.56 |
| | $r8 = -7.26$ | $d8 = 0.12$ | 1.0 | |
| $L_4$ | $r9 = -60.83$ | $d9 = 0.91$ | 1.61400 | 43.89 |
| | $r10 = 5.87$ | $d10 = 4.75$ | 1.43384 | 95.56 |
| | $r11 = -10.62$ | $d11 = 0.03$ | 1.0 | |
| $L_5$ | $r12 = 6.62$ | $d12 = 5.94$ | 1.43384 | 95.56 |
| | $r13 = -7.49$ | $d13 = 6.30$ | 1.61400 | 43.89 |
| | $r14 = -10.48$ | $d14 = 3.07$ | 1.0 | |
| $L_6$ | $r15 = -3.51$ | $d15 = 0.84$ | 1.61400 | 43.89 |
| | $r16 = 6.22$ | $d16 = 1.93$ | 1.43384 | 95.56 |
| | $r17 = -9.93$ | $d17 = 5.89$ | 1.0 | |
| $L_7$ | $r18 = 7.78$ | $d18 = 6.63$ | 1.65348 | 33.48 |
| | $r19 = 20.64$ | $d19 = 1.63$ | 1.62040 | 60.29 |
| | $r20 = 6.80$ | $d20 = 144.12$ | | |

Figure 1:
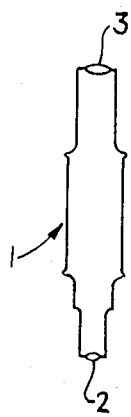
FIG. 1 shows a side elevation of a microscope.

FIG. 1 illustrates in greatly simplified manner a microscope 1 comprising an objective 2 and an eyepiece 3. The objective 2, which is shown in FIG. 1 in greatly simplified form, may be an oil immersion objective having the form shown in FIG. 2 or 3. The objective shown in FIG. 2 comprises, when considered in the direction in which a light beam bearing an image of an object being viewed through the microscope 1 passes, a cover glass 4 and an assembly of three converging simple lenses $L_1$, $L_2$ and $L_3$. The lens $L_1$ is a hemispherical front lens, the lens $L_2$ is a positive-power meniscus lens, and the lens $L_3$ is a biconvex lens made of fluorite. Lenses similar to the lenses $L_1$ and $L_2$ are used in most high power microscope objectives. The lens $L_3$ gives contributions to the apochromatic correction of the objective by reducing the secondary spectrum. The three lenses $L_1$, $L_2$ and $L_3$ serve to present a numerical aperture of 1.30 in immersion oil to an incoming light beam and to reduce the divergence of the beam to approximately zero.

The objective further comprises a doublet lens $L_4$ of approximately zero power, for reducing aberrations produced by the lenses $L_1$, $L_2$ and $L_3$ while still maintaining approximately the same convergence of the light beam. The doublet lens $L_4$ has a positive component made of fluorite and a negative component made of borate flint, and thereby gives contributions to the apochromatic correction of the objective. The lens $L_4$ is provided mainly to reduce chromatic aberration and field curvature.

The objective also comprises an assembly of three separated doublet lenses $L_5$, $L_6$ and $L_7$ which act in conjunction to correct the remainder of the aberrations, and in particular to provide an acceptably flat image field and to reduce the secondary spectrum sufficiently to render the objective apochromatic. The doublet lens $L_5$ is a positive-power biconvex doublet lens and comprises a biconvex component made of fluorite and a negative-power meniscus lens made of borate flint. The doublet lens $L_6$ is a high-power negative doublet lens having a positive component made of fluorite and a negative component made of borate flint, the effects of the anomalous glasses being maximized by making the individual components of the doublet lens of high power.

The lens $L_6$ may be regarded as a high negative power lens since its focal length lies in the range from $-3$ to $-5$ times the focal length of the objective as a whole. The doublet lens $L_7$ is of thick meniscus form.

The three doublet lenses $L_5$, $L_6$ and $L_7$ provide field flattening and apochromatic correction. Field flattening is achieved by maintaining the aperture at the doublet lens $L_6$ small and separating the high-power negative doublet lens $L_6$ from the positive-power doublet lens $L_5$, thereby producing positive convergence with negative field curvature. Additional field flattening is obtained from the doublet lens $L_7$ by virtue of the fact that it is separated from the doublet lens $L_6$, and also by virtue of its thickness. The secondary spectrum of the objective is reduced by using anomalous glasses in the doublet lens $L_5$, and additional reduction is achieved by using anomalous glass, in this case fluorite, in the positive component of the doublet lens $L_6$. The negative-power component of the doublet lens $L_6$ is of much higher power than the positive-power component thereof in order that the doublet lens as a whole should have high negative power. Using such a high negative power component leads to the basic chromatic aberration of the objective being considerably undercorrected, but this is rectified by the doublet lens $L_7$ in combination with the other lenses of the objective. The doublet lenses $L_5$ and $L_7$ serve also to maintain the positions of the conjugates and the value of the magnification existing without the use of the doublet lens $L_6$.

The equivalent focal length of the objective shown in FIG. 2 is 1.57 mm and its magnification is 100. As stated, it accepts a numerical aperture of 1.30 in immersion oil. The focal length of the lenses $L_1$, $L_2$, $L_3$, $L_4$, $L_5$, $L_6$ and $L_7$ of the objective shown in FIG. 2 are approximately as follows: 2.5 mm, 8.5 mm, 12.5 mm, 150 mm, 12.5 mm, $-6.5$ mm and 33 mm. From the value given for the doublet lens $L_4$ it will be appreciated that by saying it has approximately zero power it is intended to be meant that its focal length is about one hundred times that of the objective as a whole.

The objective shown in FIG. 3 is a slightly modified form of the objective shown in FIG. 2. The modifications are minor and serve to improve the correction of some of the aberrations which, although they are reduced to an acceptably low level in the objective shown in FIG. 2, are not fully corrected. This applies in particular to spherical aberration. The description given above regarding the construction of the objective shown in FIG. 2 applies equally to the objective shown in FIG. 3. The equivalent focal length of the objective shown in FIG. 3 is 1.58 mm and its magnification is 99.7. Like the FIG. 2 objective, it accepts a numerical aperture of 1.30 in immersion oil.

It should be noted that although this invention has been particularly described with reference to oil immersion objectives, where the need for the invention is greatest, it could also be employed with other types of microscope objectives.

What is claimed is:

1. An apochromatic microscope objective, comprising, when considered in the direction in which a light beam bearing an image of an object being viewed through a microscope employing the objective passes, a first lens assembly, of converging lens elements, a doublet meniscus lens, which is of low positive power and which comprises a positive-power lens element made of glass that is anomalous in the same sense as fluorite and a negative-power lens element made of glass that is anomalous in the opposite sense to fluorite, for reducing aberrations present in the beam as a result of passage through the first lens assembly, and a field-flattening lens assembly which comprises first and second positive-power lens elements made of glass that is anomalous in the same sense as fluorite, first and second negative-power lens elements made of glass that is anomalous in the opposite sense to fluorite, the first negative-power lens element being one component of a biconvex doublet lens of which the said first positive-power lens element is another component, and the second negative-power lens element being biconcave and spaced from the said biconvex doublet lens to impose negative field curvature on the light beam and being one component of a concavo-convex doublet lens of high negative power a further component of which is the said second positive-power lens element, and also comprises a positive-power thick meniscus lens spaced from the said second positive-power lens element, the thick meniscus lens being a doublet lens of which one component is a positive-power meniscus lens element and of which the other component is a negative-power meniscus lens element.

* * * * *